United States Patent
Bedingfield et al.

(10) Patent No.: US 6,873,696 B2
(45) Date of Patent: Mar. 29, 2005

(54) SYSTEM AND METHOD FOR PRESERVING CALLER PRIVACY

(75) Inventors: J. Carl Bedingfield, Lilburn, GA (US); Annie Nguyen, Kirkland, WA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 353 days.

(21) Appl. No.: 09/742,272

(22) Filed: Dec. 21, 2000

(65) Prior Publication Data

US 2002/0080944 A1 Jun. 27, 2002

(51) Int. Cl.[7] .................................................. H04M 1/56
(52) U.S. Cl. ......................... 379/207.02; 379/142.06; 379/207.02
(58) Field of Search ................... 379/142.02, 142.06, 379/207.02

(56) References Cited

U.S. PATENT DOCUMENTS

| | | | |
|---|---|---|---|
| 5,311,569 A | * 5/1994 | Brozovich et al. | 379/45 |
| 5,497,414 A | 3/1996 | Bartholomew | 379/142 |
| 5,701,301 A | 12/1997 | Weisser, Jr. | 370/428 |
| 5,864,612 A | 1/1999 | Strauss et al. | 379/142 |
| 5,901,209 A | * 5/1999 | Tannenbaum et al. | 379/142.09 |
| 6,041,112 A | * 3/2000 | Malik | 379/209.01 |
| 6,333,931 B1 | * 12/2001 | LaPier et al. | 370/385 |
| 6,343,120 B1 | * 1/2002 | Rhodes | 379/142.01 |
| 6,445,781 B1 | * 9/2002 | Heinmiller et al. | 379/142.01 |
| 6,574,323 B1 | * 6/2003 | Manuel et al. | 379/207.02 |

* cited by examiner

*Primary Examiner*—Ahmad F. Matar
*Assistant Examiner*—Rasha S AL-Aubaidi
(74) *Attorney, Agent, or Firm*—Woodcock Washburn LLP

(57) ABSTRACT

A method and system are disclosed for preserving caller privacy in an advanced intelligent network comprising a service switching point and a second service switching point. The service switching point is adapted to suspend calls directed to a predefined number and forward signaling information associated with the call to the service control point. The service control point is adapted to alter the signaling information if a privacy restriction indicator in the signaling information is activated and to forward the altered signaling information to the service switching point. The method comprises the following steps: forwarding information identifying a calling party and any privacy restrictions on the calling party information from the service switching point to the service control point; and if the privacy restrictions indicate that the calling party information should not be delivered to the called party, altering the calling party information and forwarding the altered information to the service switching point.

34 Claims, 3 Drawing Sheets

SYSTEM AND METHOD FOR PRESERVING CALLER PRIVACY

FIELD OF THE INVENTION

The present invention generally relates to the field of telecommunications and to an apparatus and method for managing telephony-based services. More particularly, the present invention relates to an intelligent or advanced application, such as an Advanced Intelligent Network (AIN) application, for preserving caller privacy within a telephone network.

BACKGROUND OF THE INVENTION

In existing public switched telephone networks (PSTN) that employ a signaling system 7 (SS7) architecture for call-setup, billing, routing, and information exchange, the number of the party placing a call is carried across the SS7 network between switches and between carriers. Customers may request a service that his/her name and number remain private, in which case the calling party number is still routed through the SS7 network but is also accompanied by a calling party restriction indicator (CPRI) which identifies that the calling party information is to remain private. When a call with a CPRI indicating the calling party information is to remain private is received at the last switch before a call is delivered to the end user, the calling party number is not delivered.

Government regulations impose a requirement that carriers honor privacy markings and not disclose information that has been marked private outside the network of recognized carriers, i.e. to end users and private concerns. Until recently, all SS7 switching equipment connected to PSTN networks has been owned by the PSTN carriers and not by private concerns. Accordingly, complying with government regulations has not presented a problem as existing SS7 systems removed the calling party information at the last switch, none of which were privately owned, and prior to delivery to the end user. This was sufficient to comply with the regulations.

Recently, however, private organizations have begun to install SS7 switching equipment of their own which is connected to public telephone networks. Where private switching equipment has been installed, the methods employed in existing SS7 networks would allow information that has been marked private to be delivered outside the network of recognized carriers to the privately owned switching equipment in violation of government regulations. SS7 networks simply were not designed to comply with the regulation where the last switch to which the called party is connected is privately owned.

Accordingly, there is a business need imposed by government regulations for systems and methods to insure that calling party information that has been marked private not be delivered to privately owned equipment, particularly in circumstances wherein a private organization owns the last switching point through which a call is routed.

SUMMARY OF THE PRESENT INVENTION

According to an aspect of the invention, there is provided a system for preserving caller privacy in a telephone network. Caller privacy is maintained even in the case when the last switching point through which a call may be routed is privately maintained. The system maintains the privacy of the original calling party as well as any parties that may forward the call to the called party.

A system in accordance with the invention includes a service switching point and a service control point. The service switching point is adapted to suspend calls directed to a predefined number and forward signaling information associated with the call to the service control point. The service control point is adapted to alter the signaling information if a privacy restriction indicator in the signaling information is activated and to forward the altered signaling information to the service switching point. In one embodiment, the signaling information is in SS7 format and comprises a calling party number that may be altered by the service control point if the privacy restriction indicator is active.

A method of preserving caller privacy in a telephone network is also disclosed. The method comprises forwarding information identifying a calling party, such as a name or number, and any privacy restrictions on the calling party information from the service switching point to the service control point. The method further comprises, if the privacy restrictions indicate that the calling party information should not be delivered to the called party, altering the calling party information and forwarding the altered information to the service switching point. Of course, if the privacy restrictions indicate that the calling party information may be delivered to the called party, the calling party information is forwarded to the service switching point unaltered and intact. Thereafter, the call along with the signaling information containing the calling party information, which may have been altered, is forwarded to the end user.

In accordance with still another aspect of the invention, there is provided a method of protecting party privacy in an SS7 network. The method comprises the following steps: upon receipt of a call to a predefined number at a switching point, suspending the call and forwarding SS7 signaling to a service control point; at the service control point, if a privacy restriction indicator in the SS7 signaling is activated, altering the SS7 signaling; and forwarding the altered SS7 signaling to the service switching point. Of course, if the privacy restriction indicator in the SS7 signaling is not activated, the SS7 signaling is left intact. Thereafter, the call along with the SS7 signaling is forwarded to the end user.

The above-listed features of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

According to an aspect of the present invention, an apparatus and method for preserving caller privacy may be implemented using an AIN or AIN-type network. AIN systems are described in U.S. Pat. No. 5,701,301, which is incorporated herein by reference in its entirety. In particular, an AIN network with advanced intelligent network capabilities may be utilized to implement the various features and aspects of the invention. It should be noted, however, that the implementation of the present invention is not limited to AIN-based networks, and other advanced or intelligent networks and arrangements may be used to implement the invention.

Figure 1:
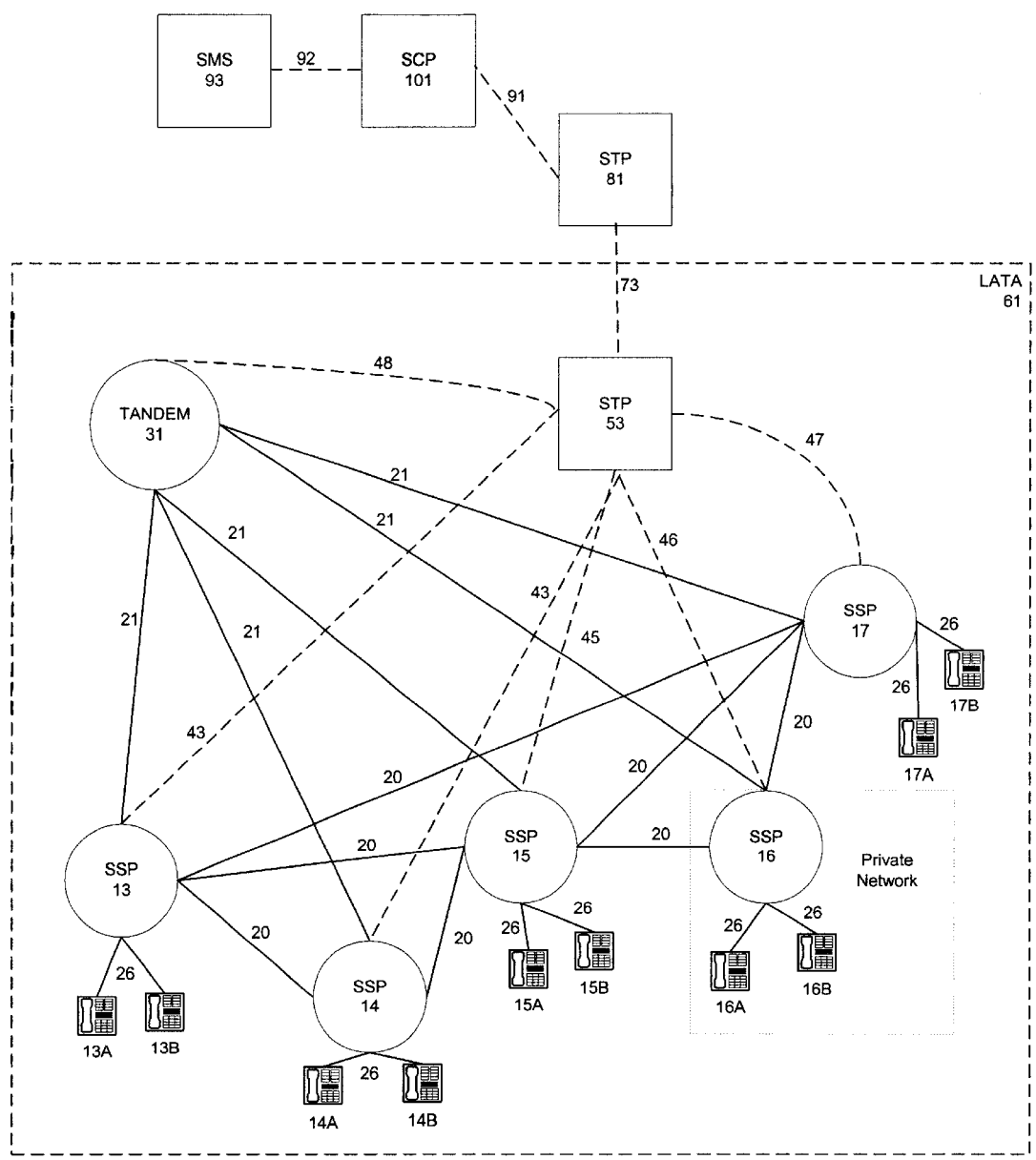
FIG. 1 illustrates, in a general block diagram form, an AIN-based system for implementing intelligent network management features, in accordance with an embodiment of the present invention.

Referring now to the accompanying drawings, FIG. 1 illustrates an AIN-based network arrangement incorporating the various features of the invention, as further described below. In the embodiment of FIG. 1, a telephone network within local access and transport area (LATA) 61 is provided that defines a calling service area. LATA 61 includes stations, e.g., stations 13A, 13B, 14A, 14B, 15A, 15B, 16A, 16B, 17A and 17B, and corresponding switches, e.g., service switching points (SSP) (also known as central offices (CO)) 13, 14, 15, 16 and 17. COs 13, 14, 15, 16 and 17 may comprise, for example, 1AESS, 5ESS, or DMS-100 switches.

In the example shown in FIG. 1, each switch may include different types of facilities and/or triggers. SSPs 13–17 are each programmable switches which: recognize AIN-type calls, launch queries to service control point (SCP) 101, and receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in SCP 101.

As further shown in FIG. 1, either a direct route or a tandem route may exist between all switches. In LATA 61, direct trunks 20 may exist between SSP 13, SSP 14, SSP 15, SSP 16 and SSP 17. Assuming LATA 61 to be a large service area, direct trunks 20 may not be available between each switch, either due to geographical limitations or due to excessive traffic. For example, SSP 13 may alternatively use tandem trunk 21 to a tandem switch 31 and may use trunk 21 to SSP 17 to terminate an offered call. This alternative path may be an overflow route for traffic that cannot find room on trunk 20 between SSP 13 and SSP 17. Trunks 21 and 22 may be either SS7 controlled trunks, or multi-frequency trunks (MF).

Each office equipped as an AIN SSP may allow normal switch processing to be suspended at specific points in a call so that the switch may send an AIN message query to SCP 101. Service control point 101 may execute software based service logic and return call processing instructions to the triggering AIN SSP. New services may be provisioned by assigning AIN SSP triggers to customer lines, trunks, and/or NANP telephone numbers.

As described above, within LATA 61 is a tandem switch 31 that is connected to SSPs 13–17. Tandem switch 31 is coupled to SSPs 13–17 of LATA 61 by trunks 21. Trunks 21 may interconnect tandem switch 31 with each SSP within LATA 61 for routing of telephone calls. However, trunks 21 may also be used to connect tandem switch 31 to, e.g., toll calls that terminate on SSPs (not shown) outside LATA 61; and, calls originating outside of LATA 61 but terminating on an SSP within LATA 61.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 43, 44, 45, 46, 47, 48, 73 and 91 between each SSP and tandem switch 31 and SCP 101. The data messages may be formatted in accordance with the Transaction Capabilities Applications Part (TCAP). Typically, ISDN Users Part (ISUP) may be used for signaling purposes between, for example, SSPs 13–17. In such a case, the SSPs map appropriate data between TCAP and ISUP protocols, and vice versa. The telephone network employs an upper-level software controlled network through the Signaling Transfer Points (STPs) and the SCP (and/or ISCP). The software presides over the hardware to check the call route and the availability of connection prior to hardware connection.

Accordingly, the connections by links 43–48, link 73, and link 91 through STPs 53 and 81 are for signaling purposes and allow SSPs 13–17 to send and receive messages to and from SCP 101 via the STPS. As shown for example in FIG. 1, a local STP 53 may act as the data messaging control point for LATA 61. That is, all data messages from SSPs within LATA 61 or directed to SSPs within LATA 61 may be transmitted through STP 53. Accordingly, CCS links 43–48 are shown establishing a data link between STP 53 and either tandem switch 31, SSP 13, SSP 14, SSP 15, SSP 16 or SSP 17. Further, one or more regional STPs may be provided for data messaging with the LATA. In FIG. 1, regional STP 81 is illustrated as receiving and transmitting data messages with LATA 61 by connecting to STP 53 by line 73 and connecting to SCP 101 by link 91.

The present invention provides a system within the AIN or AIN-type environment for preserving caller privacy. In accordance with the invention, when the caller privacy service is activated, and a party at telephone station 15A of FIG. 1, for example, places a call to a party at telephone station 16A, the calling party information is removed from the call information before it reaches SSP 16. Accordingly, the party at telephone station 16A will not be able to identify the name or telephone number of the party at telephone station 15A from the signaling information received with the call. Furthermore, a technician with access to SSP 16 or with access to call records which may be kept at SSP 16 will likewise not be able to identify the name or telephone number of the party at telephone station 15A. Additionally, if a call is forwarded between multiple phone stations, for example telephone stations 13A, 14A, and 17A, before being routed to station 16A, signaling information identifying any of stations 13A, 14A, and 17A will not be made available at telephone station 16A if the operators of one or more of those stations have activated the caller privacy service.

As noted above, the present invention is directed at preserving calling party privacy in an SS7 network even under circumstances wherein privately owned switching equipment is connected to the public network. Generally, SS7 networks use out of band signaling. In addition to supporting routing of calls, signaling information is used to provide caller privacy. Specifically, each call might have associated with it signaling information with the following attributes: a calling party number ("CPN") which identifies the phone number of the party placing the call; a calling privacy restriction indicator ("CPRI") associated with the CPN that indicates whether the CPN is to remain private, i.e. not made available to the called party; an originally called number ("OCN") which identifies the phone number that was the original destination for the call; a CPRI associated with the OCN to indicate whether the OCN is to remain private; a redirecting number ("RN") which identifies the number from which a call was most recently redirected, i.e. forwarded; and a CPRI associated with the RN to indicate whether the RN is remain private. The CPRI's associated with the CPN, OCN, and RN are employed by the system as described below to determine whether the CPN, OCN, and RN may be made available to end-users.

Figure 2:
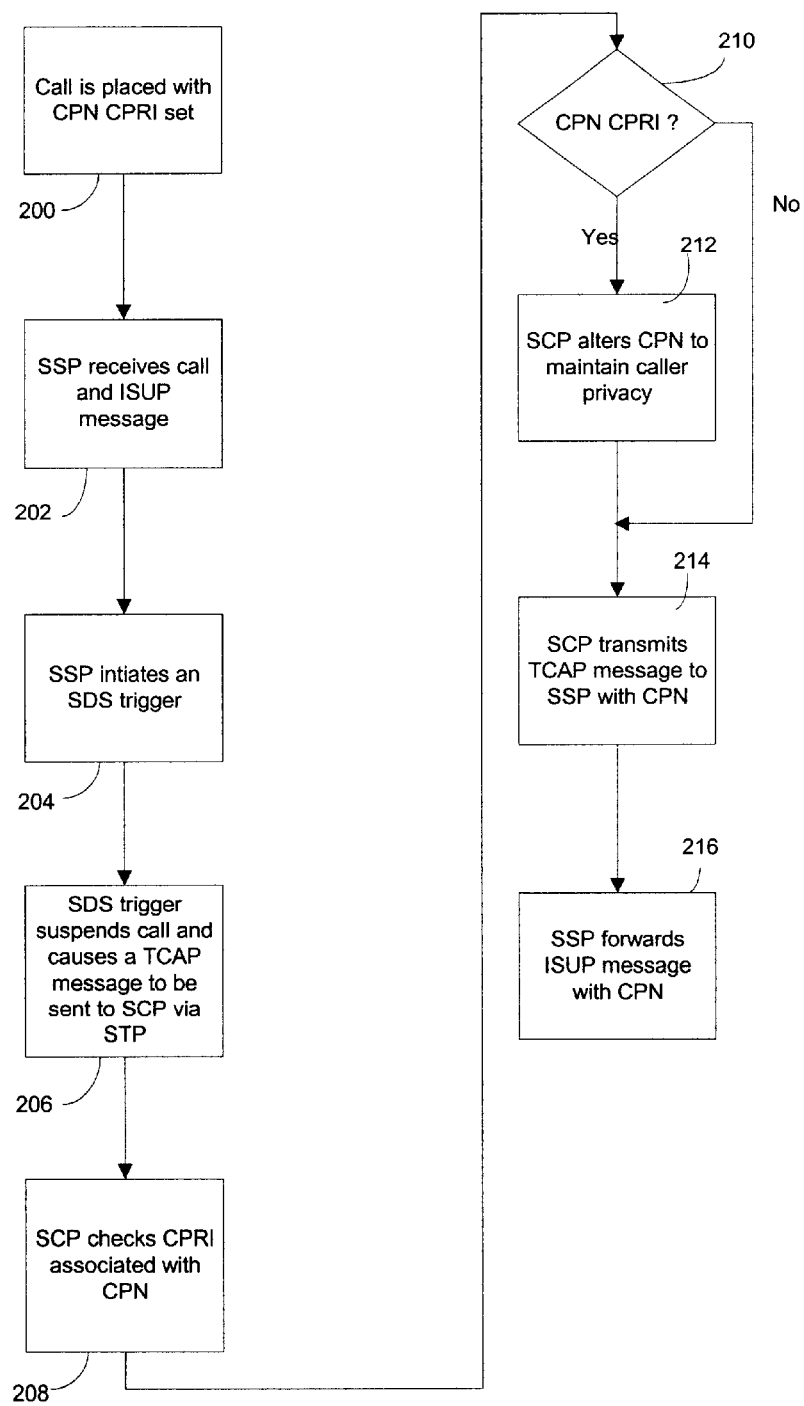
FIG. 2 illustrates an exemplary flow diagram of call processing, according to an aspect of the present invention.

Referring now to the FIG. 2, there is illustrated an exemplary overview of the call flow logic according to an aspect of the present invention. As shown in FIG. 2, at step 200 a call is placed from a telephone station, for example station 15A of FIG. 1, and is directed to a second telephone station, for example telephone station 16A. It is assumed for purposes of illustration that the operator of telephone station 15A has indicated that he/she does not wish their number to be made available to called parties. As a consequence, when the call is made from telephone station 15A, the call's signaling information comprises a CPN which is set to the telephone number of station 15A as well as a CPRI associated with the CPN that indicates the CPN should be maintained as private. It is also presumed for purpose of this illustration, that SSP 16 and telephone station 16A are part of a private network. Accordingly, in order to comply with regulations the CPN should not be delivered to privately owned switching equipment 16.

At step 202, the call arrives at SSP 15 along with its related call signaling information. In one embodiment, the signaling information is relayed to SSP 15 in the form of an ISUP message.

Because SSP 16 is privately owned and therefore should not receive the CPN information, SSP 15 has been programmed to react to calls that are directed to destinations such as station 16A which are connected to switching point 16. Specifically, SSP 15 has been programmed with a trigger that is activated upon receipt of calls directed to a telephone number or a block of telephone numbers corresponding to the telephone stations that are connected to the SSP 16. With respect to the example, the telephone number for telephone station 16A is included in the block of telephone numbers that SSP 15 has been programmed to react to. Thus, at step 204, SSP 15 initiates a trigger. In one embodiment, the trigger is a specific digit string (SDS) trigger.

At step 206, the trigger causes SSP 15 to suspend the call and forward signaling information to SCP 101 via STPs 53 and 81. The signaling information identifies the calling party number (CPN), i.e., the phone number for telephone station 15A as well as the CPRI associated with station 15A which for purposes of this example indicates that the CPN is to remain private. In one embodiment the signaling information takes the form of a TCAP message.

SCP 101 has been programmed to react to the signaling information received from SSP 15. Specifically, SCP 101 has been programmed to alter the CPN so as to obscure the source of the call if the associated CPRI indicates privacy is to be maintained. In one embodiment, the CPN is altered by filling all digits of the CPN with zeros, however, any other un-dialable number combination could also be used. Thus, at step 208, SCP 101 checks the CPRI associated with the CPN. If at step 210, the CPRI associated with the CPN indicates that privacy is to be maintained, at step 212, SCP 101 alters the CPN. Of course, if at step 210, the CPRI associated with the CPN does not indicate that the CPN is to be maintained as private, the CPN is not altered.

At step 214, SCP 101 forwards signaling information, including the CPN, which may be either altered or unaltered, to SSP 15. In one embodiment, the signaling information is formatted as a TCAP message. Thereafter, at step 216, SSP 15 forwards the call along with signaling information to SSP 16. Of course, if the CPN has been altered at step 212, the true CPN is not delivered to SSP 16 and cannot be identified when the call reaches telephone station 16A. Thus, systems and methods in accordance with the present invention operate to preserve the privacy of the calling party.

It often happens that calls are forwarded from one, or two or more telephone stations before arriving at its final destination. For example, referring to FIG. 1, while a call may initially have been placed from telephone station 15A to 14A, the operator of telephone station 14A may have arranged to have calls forwarded to telephone station 13A. The call may be forwarded again to its ultimate destination at telephone station 16A. As calls are forwarded through the system, the call signaling information retains data about the various stations through which the call has been routed. Specifically, in addition to the calling party number (CPN) discussed above with reference to FIG. 2, the signaling information may have recorded therein the originally called number (OCN), and the redirecting number (RN). Both the OCN and RN may have associated therewith in the signaling information a calling privacy restriction indicator (CPRI) which identifies whether the operator of the particular telephone station has requested the phone number to remain private.

Figure 3:
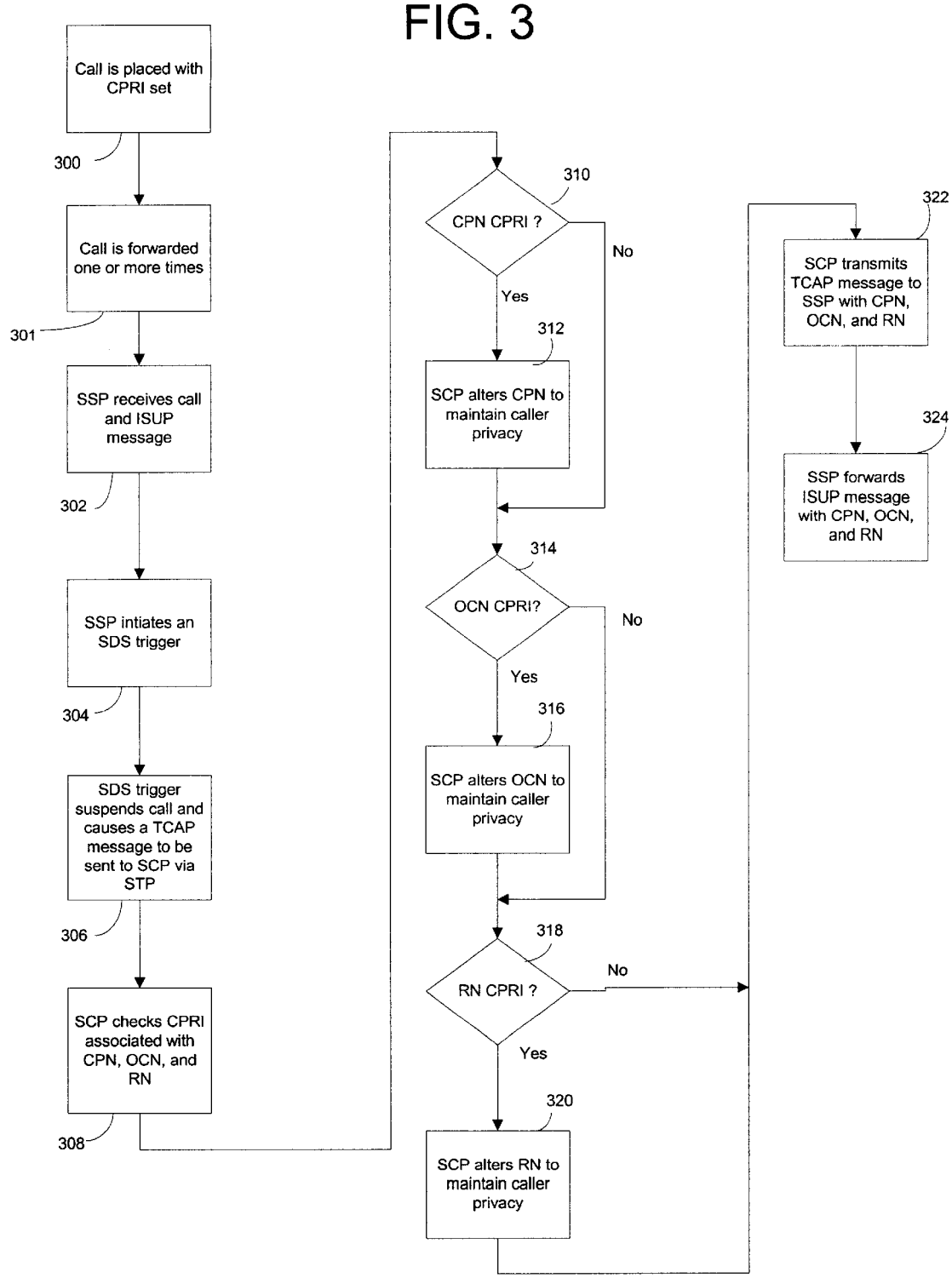
FIG. 3 illustrates an exemplary flow diagram of call processing, according to an aspect of the present invention.

In accordance with another aspect of the invention, there is provided a system and method for maintaining OCN and RN privacy. Referring now to FIG. 3, there is illustrated an exemplary overview of the call flow logic according to this aspect of the present invention. As shown in FIG. 3, at step 300 a call is placed. At step 301 the call is forwarded one or more times. For example, referring to FIG. 1, a call may be placed from station 15A to station 14A. The call may be forwarded from station 14A to station 13A. Station 13A may in turn forward the call to station 16A. As a consequence of this call forwarding, the signaling information associated with the call may comprise values for CPN, OCN, and RN. Each of the CPN, OCN, and RN has associated therewith a CPRI value indicating whether the operator of the particular telephone station has chosen to maintain caller privacy.

Referring again to FIG. 3, at step 302, the call arrives at SSP 15 along with its related signaling information. In one embodiment, the signaling information is relayed to SSP 15 in the form of an ISUP message.

It is presumed for purposes of this illustration that SSP 16 is privately owned and calling party information that has been marked private cannot be delivered thereto. Therefore, SSP 15 has been programmed to react to calls that are directed to destinations, such as station 16A, that are connected to switching point 16. Specifically, SSP 15 has been programmed with a trigger that is activated upon receipt of calls directed to a block of telephone numbers corresponding to the telephone stations that are connected to SSP 16. With respect to the example, this block of numbers includes the telephone number for station 16A. Thus, at step 304, SSP 15 initiates a trigger. In one embodiment, the trigger is a specific digit string (SDS) trigger.

At step 306, the trigger causes SSP 15 to suspend the call and forward signaling information to SCP 101 via STPs 53 and 81. The signaling information identifies the calling party number (CPN), i.e. the phone number for telephone station 15A, the originally called party number (OCN), i.e., the phone number for telephone station 14A, and the redirecting number (RN), i.e., the phone number for telephone station 13A. In addition, the signaling information comprises CPRI's for each of the CPN, OCN, and RN. In one embodiment the signaling information takes the form of a (TCAP) message.

SCP 101 has been programmed to react to the signaling information received from SSP 15. Specifically, SCP 101 has been programmed to alter the CPN, OCN, and RN to obscure the source of the call if the associated CPRI's indicate privacy is to be maintained. In one embodiment, the CPN, OCN, and RN are altered by filling some or all digits with zeros. Thus, at step 308, SCP 101 checks the CPRI's associated with the CPN, OCN and RN.

If at step 310, the CPRI associated with the CPN indicates that privacy is to be maintained, at step 312, SCP 101 alters the CPN. Of course, if at step 310, the CPRI associated with the CPN does not indicate that the CPN is to be maintained as private, the CPN is not altered.

If at step 314, the CPRI associated with the OCN indicates that privacy is to be maintained, at step 316, SCP 101 alters the OPN. If at step 314, the CPRI associated with the CPN does not indicate that the OCN is to be maintained as private, the OCN is not altered.

If at step 318, the CPRI associated with the RN indicates that privacy is to be maintained, at step 320, SCP 101 alters the RN. If at step 320, the CPRI associated with the RN does not indicate that the RN is to be maintained as private, the RN is not altered.

At step 322, SCP 101 forwards signaling information, including the CPN, OCN, and RN which may be either altered or unaltered, to SSP 15. In one embodiment, the signaling information is formulated as a TCAP message. Thereafter, at step 324, SSP 15 forwards the call along with signaling information to SSP 16. Of course, if the CPN, OCN, or RN have been altered, the true values of the CPN, OCN, and RN are not delivered to SSP 16 and therefore cannot be identified either when the call reaches telephone station 16A or by a technician with access to SSP 16.

As described above, the present invention provides a convenient system for preserving caller privacy. The system insures that a caller's phone number is maintained as private even when the call is directed to a phone station that connects from a private switching point. Accordingly, the systems and methods of the present invention represent a significant improvement in the art.

It is noted that the written description provided herein contains acronyms which refer to various communication services and system components. Although known, use of several of these acronyms is not strictly standardized in the art. For purposes of the written description herein, acronyms will be defined as follows:

10D—10 Digit
AIN—Advanced Intelligent Network
CCIS—Common Channel Interoffice Signaling
CCS—Common Channel Signaling
CO—Central Office
CPRI—Calling Privacy Restriction Indicator
CPN—Calling Party Number
DN—Dialed Number
EO—End Office
ISUP—ISDN Users Part
LATA—Local Access and Transport Area
MF—Multi-Frequency
NANP—North American Numbering Plan
NPA—Numbering Plan Area
NXX—Central Office Code
PSTN—Public Switched Telephone Network
SCE—Service Creation Environment
SDS—Specific Digit String
SCP—Service Control Point
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. For example, while the systems has been described with particular functions being performed by an SCP, some or all of those functions might be performed by another computing device such as, for example, an STP. Those skilled in the art, having the benefit of the teachings of this specification, may effect numerous modifications thereto and changes may be made without departing from the scope and spirit of the invention in its aspects.

What is claimed is:

1. A system for preserving caller privacy in a telephone network using signaling information to support call service, comprising:
    a first service switching point; and
    a service control point communicating with said first service switching point, and adapted to alter the signaling information if a privacy restriction indicator in the signaling information is activated,
    wherein said first service switching point is adapted to suspend calls directed to a predefined number connected through a privately maintained second service switching point and forward signaling information associated with the call to said service control point.

2. The system of claim 1, wherein the signaling information is in SS7 format.

3. The system of claim 1, wherein said service control point is further adapted to forward altered signaling information to said first service switching point.

4. The system of claim 3, wherein said first service switching point is further adapted to forward altered signaling information to said privately maintained second service switching point.

5. The system of claim 1, wherein said signaling information comprises a calling party number and said service control point is adapted to alter the calling party number if the privacy restriction indicator specifies privacy restrictions apply to the calling party number.

6. The system of claim 5, wherein said service control point is adapted to alter the calling party number so that the identity of the calling party can not be discerned.

7. The system of claim 5, wherein said service control point is adapted to alter the calling party number by replacing digits of the calling party number with an un-dialable number combination.

8. The system of claim 1, wherein the signaling information comprises an originally called number and said service control point is adapted to alter the originally called number if the privacy restriction indicator specifies privacy restrictions apply to the originally called number.

9. The system of claim 8, wherein said service control point is adapted to alter the originally called number so that the identity of the originally called number can not be discerned.

10. The system of claim 5, wherein said service control point is adapted to alter the originally called number by replacing digits of the originally called number with an un-dialable number combination.

11. The system of claim 1, wherein the signaling information comprises a redirecting number and said service control point is adapted to alter the redirecting number if the privacy restriction indicator specifies privacy restrictions on the redirecting number.

12. The system of claim 11, wherein said service control point is adapted to alter the redirecting number so that the identity of the redirecting number can not be discerned.

13. The system of claim 11, wherein said service control point is adapted to alter the redirecting number by replacing digits of the redirecting number with an un-dialable number combination.

14. The system of claim 1, further comprising a signaling transfer point for transferring communications between said service control point and said first service switching point.

15. A system for preserving caller privacy, comprising:
a first service switching point; and
a computing device communicating with said first service switching point, and adapted to alter a calling party number if a corresponding privacy restriction indicator is activated,
wherein said first switching point upon receipt of a call to a predetermined number connected through a privately maintained second service switching point is adapted to suspend the call and forward information specifying a calling party number and corresponding privacy restriction indicator to the computing device.

16. The system as recited in claim 15, wherein said computing device is further adapted to forward an altered calling party number to said first switching point.

17. The system as recited in claim 15, wherein said first switching point is further adapted to forward said altered calling party number to said privately maintained second service switching point.

18. In an advanced intelligent network having a first service switching point and a service control point, a method of preserving caller privacy, comprising:
at the first service switching point, suspending a call directed to a predefined number connected through a privately maintained second service switching point and forwarding information identifying a calling party and information specifying privacy restrictions to the service control point; and
at the service control point, if the information specifying privacy restrictions indicates that the information identifying the calling party should not be delivered to a called party, altering the information identifying the calling party and forwarding altered calling party information to the first service switching point.

19. The method of claim 18, wherein the information identifying a calling party is the name of the calling party.

20. The method of claim 18, wherein the information identifying a calling party is the phone number of the calling party.

21. The method of claim 18, further comprising, at the first service switching point, receiving a call and detecting that the call is to be directed by the privately maintained second service switching point to an end user.

22. The method of claim 18, further comprising, at the privately maintained second service switching point, upon receipt of the altered calling party information from the first service switching point, forwarding the altered information to an end user.

23. The method of claim 18, further comprising, at the first service switching point, if the information specifying privacy restrictions indicates that the information identifying the calling party may be delivered to a called party, forwarding the information identifying the calling party to the privately maintained second service switching point.

24. A method of protecting party privacy in an SS7 network, comprising:
upon receipt of a call at a first switching point to a predefined number connected through a privately maintained second service switching point, suspending the call and forwarding SS7 signaling to a service control point;
at the service control point, if a privacy restriction indicator in the SS7 signaling is activated, altering the SS7 signaling; and
forwarding the altered SS7 signaling to the first service switching point.

25. The method of claim 24, further comprising forwarding the altered SS7 signaling to an end user.

26. The method of claim 24, wherein said privacy restriction indicator specifies privacy restrictions on the calling party number, and said step of altering the SS7 signaling comprises altering the calling party number.

27. The method of claim 24, wherein said privacy restriction indicator specifies privacy restrictions on the originally called number, and said step of altering the SS7 signaling comprises altering the originally called number.

28. The method of claim 24, wherein said privacy restriction indicator specifies privacy restrictions on the redirecting number, and said step of altering the SS7 signaling comprises altering the redirecting number.

29. A method of protecting caller privacy in an advanced intelligent network having a first service switching point and a service control point, comprising:
at the first service switching point, initiating a trigger upon receipt of a call directed to a predetermined end user connected through a privately maintained second service switching point;
forwarding a TCAP message containing signaling information to the service control point;
if the signaling information indicates that a privacy restriction indicator is activated, altering the signaling information; and
forwarding a TCAP message containing altered signaling information to the first service switching point.

30. The method of claim 29, further comprising forwarding an ISUP message containing the altered signaling information to an end user.

31. The method of claim 29, wherein the trigger is a specific digit string trigger.

32. The method of claim 29, wherein the privacy restriction indicator specifies privacy restrictions on the calling party number, and said step of altering the signaling information comprises altering the calling party number.

33. The method of claim 29, wherein the privacy restriction indicator specifies privacy restrictions on the originally called number, and said step of altering the signaling information comprises altering the originally called number.

34. The method of claim 29, wherein said privacy restriction indicator specifies privacy restrictions on the redirecting number, and said step of altering the signaling information comprises altering the redirecting number.

* * * * *

UNITED STATES PATENT AND TRADEMARK OFFICE
CERTIFICATE OF CORRECTION

PATENT NO. : 6,873,696 B2
DATED : March 29, 2005
INVENTOR(S) : J. Carl Bedingfield It is certified that error appears in the above-identified patent and that said Letters Patent is hereby corrected as shown below:

Title page,
Item [56], References Cited, U.S. PATENT DOCUMENTS, should read as follows:
-- 6,633,633    10/2003        Bedingfield    379/201.11 --.

Signed and Sealed this

Thirteenth Day of September, 2005

JON W. DUDAS
*Director of the United States Patent and Trademark Office*